United States Patent [19]
Roberts et al.

[11] 3,739,625
[45] June 19, 1973

[54] SHOCK TESTING MACHINE

[75] Inventors: Carroll R. Roberts; Ramon L. Glidden, both of Tulsa, Okla.; Patrick C. Molloy, North Edwards, Calif.

[73] Assignee: Avco Corporation, Tulsa, Okla.

[22] Filed: Sept. 21, 1971

[21] Appl. No.: 182,422

[52] U.S. Cl. .................................................. 73/12
[51] Int. Cl. .......................................... G01n 3/08
[58] Field of Search .............................. 73/11, 12

[56] References Cited
UNITED STATES PATENTS

| | | | |
|---|---|---|---|
| 3,485,083 | 12/1969 | Gray et al. | 73/12 |
| 3,226,974 | 1/1966 | Bresk et al. | 73/12 |
| 3,402,593 | 9/1968 | Bresk et al. | 73/12 |
| 1,921,624 | 8/1933 | Lewis | 73/11 |
| 1,561,154 | 11/1925 | Gilman | 73/11 |
| 2,696,105 | 12/1954 | Mackas | 73/12 |

Primary Examiner—Charles A. Ruehl
Attorney—Charles M. Hogan and Gary M. Gron

[57] ABSTRACT

A shock testing machine is described which has the capability of selectively programming an infinite variety of shock pulse forms to be induced into a test specimen. The test specimen is mounted on a carriage which impacts a piston slidably mounted in a cylinder forming a part of the reaction mass base of the machine. Gas pressure, within the cylinder, provides a resilient force on the piston and is controlled by the scheduled flow of an electro-viscous liquid into and out of the cylinder under the influence of variable electrical field means.

13 Claims, 5 Drawing Figures

INVENTORS.
CARROLL R. ROBERTS
RAMON L. GLIDDEN
PATRICK C. MOLLOY

ATTORNEYS.

INVENTORS.
CARROLL R. ROBERTS
RAMON L. GLIDDEN.
PATRICK C. MOLLOY.

SHOCK TESTING MACHINE

The present invention relates to testing machines and more particularly to improvements in shock testing machines which induce specific forms of shock pulses into test specimens as well as to improved programmers which control the shock pulse characteristics of such machines.

Shock testing machines of the general type herein contemplated comprise a carriage on which a test specimen, as for example an electronic control device, is mounted. This carriage is accelerated toward a fixed, reaction mass base and, upon impact, induces a shock pulse into the test specimen. The usual arrangement is for the carriage to be slidable on vertical posts and dropped from an elevated position to impact on a fixed base.

The purpose of such tests is to give assurance that the design and/or construction of a given device provides sufficient strength to withstand shock loadings which will be encountered in the contemplated usage of the device. Shock loadings can take many different forms resulting in shock pulse forms of different magnitude, duration and rate of application and removal. Three forms of shock pulses are generally recognized as being of primary interest in the shock testing industry. These shock pulse forms are the half sine wave, the sawtooth wave (initial and terminal) and the square wave.

To provide such controlled shock pulses, various forms of programmers are interposed between the carriage and the reaction mass of the testing machine. One widely used form of programmer is a lead pellet which is impacted by the carriage. The shape of the pellet controls the rate of deceleration of the carriage and thus the form of the shock pulse induced into the test specimen. Additionally, various forms of pressurized pistons and elastomeric elements, alone and in combination, have been proposed and, in some instances, used to provide this programming function.

Generally speaking a differnet type of programmer must be installed on the testing machine for each form of shock pulse and each programmer is limited to a fixed time duration of the shock force for a given impact load. This results in the testing process being relatively time consuming and requires a large inventory of programmers to meet differing test requirements for different test specimens.

The need for a universal type shock testing machine and programmer has previously been recognized and one known proposal to fulfill this need is found in U.S. Pat. No. 3,402,593. The machine disclosed in that patent is, however, limited in the number of shock pulse forms which can be programmed as well as having limited control over the shock pulse form. Further mechanical adjustments and replacement of elastomeric elements are required to provide different forms of shock pulses and different time duration of the shock pulses.

Another limitation of prior shock testing machines is that the programmers tend to change in their characteristics in use. Lead pellets, of course, are deformed and expended in each test. Piston and elastomeric type programmers tend to deteriorate in one fashion or another so that they must be replaced or repaired fairly frequently. Thus to maintain the accuracy required of shock tests, considerable diligence and expense is involved.

One object of the invention is to provide an improved shock testing machine which is truly universal in its ability to induce a wide variety of shock pulse forms into a test specimen and also to vary the time duration of such shock pulses.

Another object of the invention is to provide an improved programmer which may be incorporated into a shock testing machine to obtain the capabilities set forth above.

Another object of the invention is to attain the above ends in a manner requiring a minimum of complexity in changing from one form of shock pulse to another and in varyng the time duration of the shock pulse.

Another object of the invention is to minimize the frequency of maintenance and repair of programmers for shock testing machines.

These ends are broadly attained by a shock testing machine comprising a reaction mass and a carriage movable toward the reaction mass. A test specimen is mounted on the carriage. Shock pulse programming means are provided and include an impact cylinder mounted on the carriage or the reaction mass, preferably the latter. A piston is slidably mounted in the impact cylinder in the direction of carriage movement. The piston is impacted when the carriage is moved to close proximity with the reaction mass. Gas pressure within the impact cylinder acts on the piston to control the form of the shock pulse induced into the test specimen by impact on the piston. Control of the gas pressure is attained by means providing a predetermined scheduling of the gas pressure within the impact cylinder which in turn provides a predetermined resilient force on the piston.

Preferably, for most forms of shock pulses, the scheduling of gas pressure within the impact cylinder is obtained by controlled flow of liquid into and out of the impact cylinder. Such flow is varied during the period of impact to obtain the desired shock pulse form. Also it is preferred to employ an electro-viscous liquid which is characterized by having, in an electrical field, a viscosity which is proportionate to the strength of the electrical field and being essentially rigid when the strength of the field is increased to a given value. With such a liquid, flow into and out of the impact cylinder may be controlled by an electro-hydraulic valve which imposes an electrical field on the liquid. Scheduling of liquid flow is attained by generating an electrical signal to vary the strength of the electrical field of the electro-hydraulic valve.

In a further preferred form of the invention, a pair of tanks are provided and connected to the impact cylinder by conduits. Electro-hydraulic valves are employed respectively to control flow of the electro-viscous liquid between the impact cylinder and the tanks. Means are provided for selectively pressurizing the tanks, sealing them or venting them to atmosphere. With this arrangement one tank may be used as a pressurized supply of electro-viscous liquid to be introduced into the impact cylinder and the other tank used as a receiver for electro-viscous liquid discharged from the impact cylinder. On the subsequent cycle of the machine the tank pressurizing means are manipulated to reverse the supply and receiver functions of the tanks.

Another feature of the shock testing machine is found in the provision of synchronizing means accurately and adjustably timing actuation of the scheduling of liquid flow into and out of the impact cylinder as a function of carriage movement to cause piston impact. Additionally, for certain forms of shock pulses, means may be provided to selectively introduce pressurized gas into the impact cylinder, venting this cylinder and sealing the cylinder.

The above and other related objects and features of the invention will be apparent from a reading of the following description of the disclosure found in the accompanying drawing and the novelty thereof pointed out in the appended claims.

Figure 1:
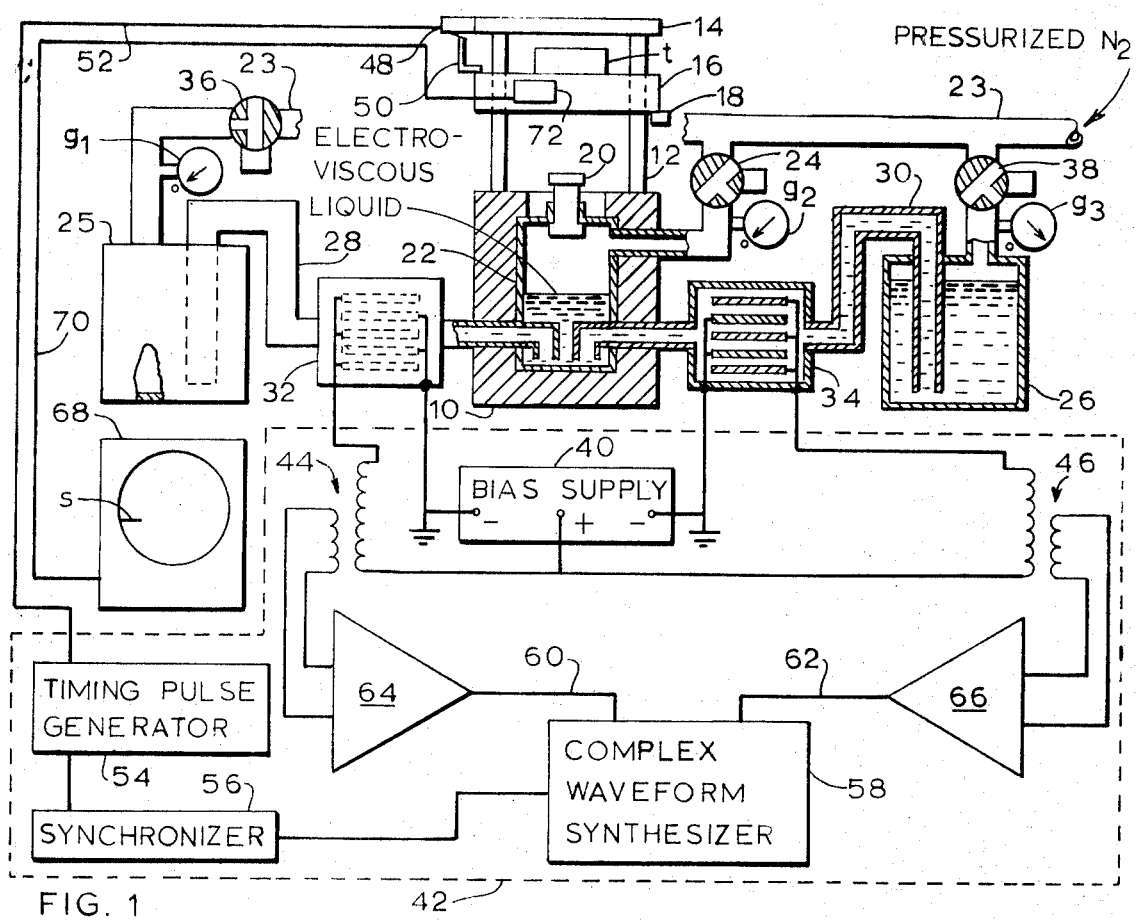
FIG. 1 is a schematic illustration of a shock testing machine and control circuit therefor in accordance with the present invention.

The machine seen in FIG. 1 comprises a base 10 which functions as a reaction mass. A pair of posts 12 project upwardly from the base 10 to a cross bar 14. A carriage 16 is slidably mounted on the posts 12, with provision being made for mounting of a test specimen $t$ on its upper surface. Latching means, herein illustrated as a stop 18, hold the carriage in an elevated position preparatory to releasing it for a shock test.

When the latching means are withdrawn, the carriage 16 falls toward the base 10, under the influence of gravity, to strike a piston 20 and generate a shock pulse in the test specimen $t$ in a manner later described in detail. The piston 20 is slidably mounted in the upper end of an impact cylinder 22 which may be supported in the base 10 in accordance with the teachings of U.S. Pat. No. 2,955,456 which is of common assignment with the present application.

The upper end of the impact cylinder 22 may be selectively sealed, vented to atmosphere or pressurized with nitrogen (from conduit 23) through manipulation of a three-way valve 24. The lower end of the impact cylinder 22 is filled with an incompressible, electro-viscous liquid which may be formulated in accordance with U.S. Pat. No. 3,047,507 or other similar teachings which produce a liquid characterized by viscosity changes which are proportionately increased in response to an increasing electrical field up to the point where the liquid becomes essentially rigid.

The impact cylinder 22 is connected to a pair of tanks 25 and 26 by conduits 28 and 30 respectively. Electro-hydraulic modulators, or valves, 32 and 34 are interposed in the conduits 28 and 30, respectively, to control flow of the electro-viscous liquid into and out of the impact cylinder 22. Three-way valves 36 and 38 are provided for the tanks 25 and 26 respectively. Manipulation of these valves permits the tanks 25 and 26 to be selectively sealed, vented to atmosphere or pressurized with nitrogen from the conduit 23.

The electro-hydraulic valves 32 and 34 comprise spaced plates or tubular elements between which the electro-viscous liquid may flow. The outer casing and alternate plates of each valve are connected to the ground terminal of an adjustable, electrical bias supply 40. The bias supply 40 comprises a part of an electrical control signal circuit 42. The remaining plates of the electro-hydraulic valves 32 and 34 are appropriately coupled to the secondary windings of transformers 44 and 46, respectively, which in turn are connected across the positive terminal of the bias supply 40. This output from the control signal circuit 42 varies the electrical field strength acting on the electro-viscous liquid to control its viscosity and rate of flow through the valves 32 and 34 as will be more fully explained hereinafter.

The control signal circuit 42 is actuated by a switch 48 mounted on the cross bar 14. When the latching means release the carriage 16, an arm 50, mounted thereon, drops away from the switch 48 allowing it to close. The switch 48 is connected to the control signal circuit 42 by a lead 52 and, more specifically, to a timing pulse generator 54 thereof. The timing pulse generator provides a sharply defined signal input to a synchronizer 56 which provides an output signal timed to the moment of impact of the carriage 16 on the piston 20. The synchronizer 56 is adjustable to obtain the proper timed relationship for all test conditions. The synchronizer output actuates a complex waveform synthesizer 58 which may be of known design incorporating electrical circuits which, when actuated, produces an output signal having a controlable complex waveform. Appropriate controls are provided for adjusting the output waveform of the synthesizer 58 to obtain a desired shock pulse form. The complex waveform synthesizer 58 comprises two channels providing complex waveform outputs on leads 60 and 62 which are respectively connected to the inputs of power amplifiers 64 and 66. The output signals of the power amplifiers 64 and 66 are then respectively connected to the primaries of the transformers 44 and 46. These signal inputs vary the electrical field strength across the electro-hydraulic valves 32 and 34 in a predetermined fashion. The field strength can be varied from a minimum value of low viscosity to a maximum value where the electro-viscous liquid is essentially rigid.

The described control signal circuit for the electro-hydraulic valves 32 and 34 and the pressure control means for the impact cylinder 22 and the tanks 25 and 26, provide means for infinitely varying, statically and dynamically, the pressure in the impact cylinder 22. Thus the gas pressure force on the piston 20 may be scheduled to induce any desired shock pulse form in a test specimen within the limitations of the physical and dynamic capabilities of the component parts of this programmer. the magnitude of the shock pulse may also be simply controlled by adjusting the height of release of the carriage 16 or by varying its weight.

To further illustrate the capabilities of the present shock testing machine and its programmer, a description will be given of the generation of a half sine shock pulse. In this description reference will be made to pressure gauges $g_1$, $g_2$ and $g_3$ which, respectively, indicate the gas pressures in tank 25, impact cylinder 22 and tank 26. "O" reference markings are provided for each gauge to indicate zero gauge pressure. Incresing pressure is indicated by increasing clockwise displacement of the gauge pointer from the "O" reference. These gauges may also be employed in the initial set up of the machine to program it for a specific shock pulse form. Also reference will be made to an oscilloscope 68 which is connected, by lead 70, to an accelerometer 72 mounted on the carriage 16. The output signal of the oscilloscope 68 provides an accurate indication of the shock pulse form actually induced into the test specimen and may be of use in adjusting the control signal circuit 42 to obtain a desired shock pulse form.

In the half sine wave shock test, the tank 26 serves as a supply source of electro-viscous liquid and is initially pressurized with nitrogen from the conduit 23. At this point it will be noted that nitrogen is preferred for its inert properties. After the tank 26 is pressurized to a maximum value the valve 38 is moved to its illustrated closed position sealing this tank. The electro-hydraulic valve 34 has a maximum electrical field across its plates so that there is no flow of liquid into the impact cylinder 22. The impact cylinder is at atmospheric pressure, having been vented by the three-way valve 24 which has then been closd to seal the impact cylinder. The electro-hydraulic valve 32 also has a maximum electrical field strength across its plates preventing flow of liquid out of the impact cylinder 22. The tank 25 will serve as a receiver for the electro-viscous liquid, as will later appear, and is vented to atmosphere by the three-way valve 36. The pressure indicated by the gauge $g_1$ will therefore be at the "O" reading throughout the test cycle now to be described.

With the test machine set up as above described, the testing cycle is initiated by releasing the latching means (stop 18) so that the carriage 16 will drop towards the piston 20. This initial porion of the cycle is indicated by the output signal $s$, on the oscilloscope 68, as an essentially straight line.

Figure 2:
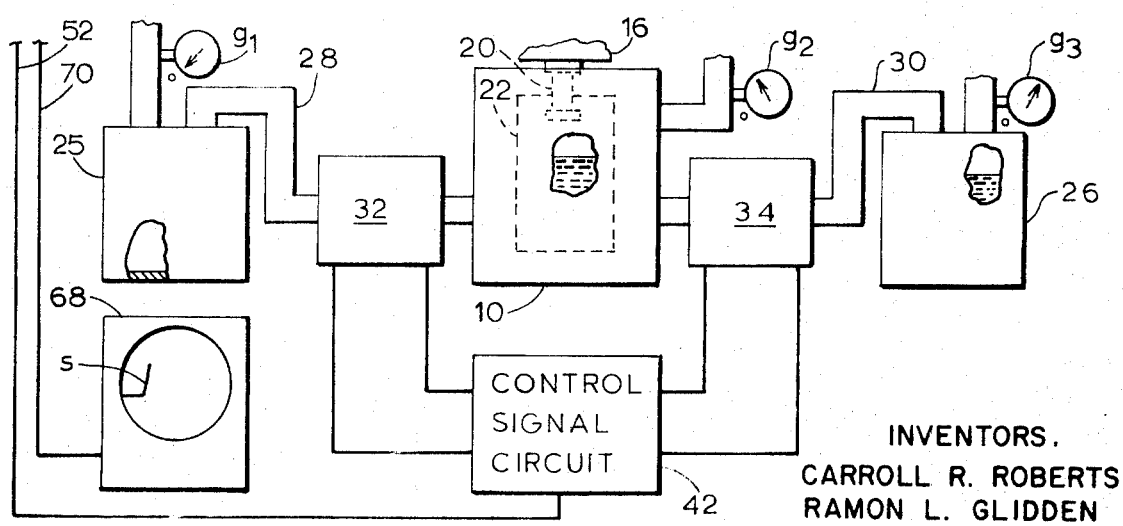
FIGS. 2, 3, 4 and 5 are fragmentary views, further simplified, of this machine, illustrating generation of a half sine wave shock pulse.

The synchronizer 56 is adjusted in proper timed relationship to the impact of the carriage 16 on the piston 20 to initiate operation of the complex waveform generator 58 so that an output signal on lead 62 will be amplified and modulate the electrical field across the electro-hydraulic valve 34 — reducing this field strength so that the electro-viscous liquid will be forced into the impact cylinder 22, thus progressively increasing the gas pressure force acting on the piston 20. This provides a controlled slope to the shock pulse being induced into the test specimen $t$ as will be seen from the signal $s$ on oscilloscope 68 in FIG. 2. It will also be seen from FIG. 2 and gauges $g_2$ and $g_3$ that the pressure in the impact cylinder 22 has increased and the pressure in the supply tank 26 has decreased as the electro-viscous liquid has been forced from the tank 26 into the cylinder 22. It is to be noted that the pressures indicated by the gauges $g_1$, $g_2$ and $g_3$ as well as the levels of the electro-viscous liquid in the tanks 25 and 26 and impact cylinder 22 are qualitative only. That is they indicate changes in direction without necessarily indicating the magnitude of such changes. It will further be noted from FIG. 2 that the tank 25 remains empty as the electrical field across the electro-hydraulic valve 32 is maintained at a maximum value.

Figure 3:
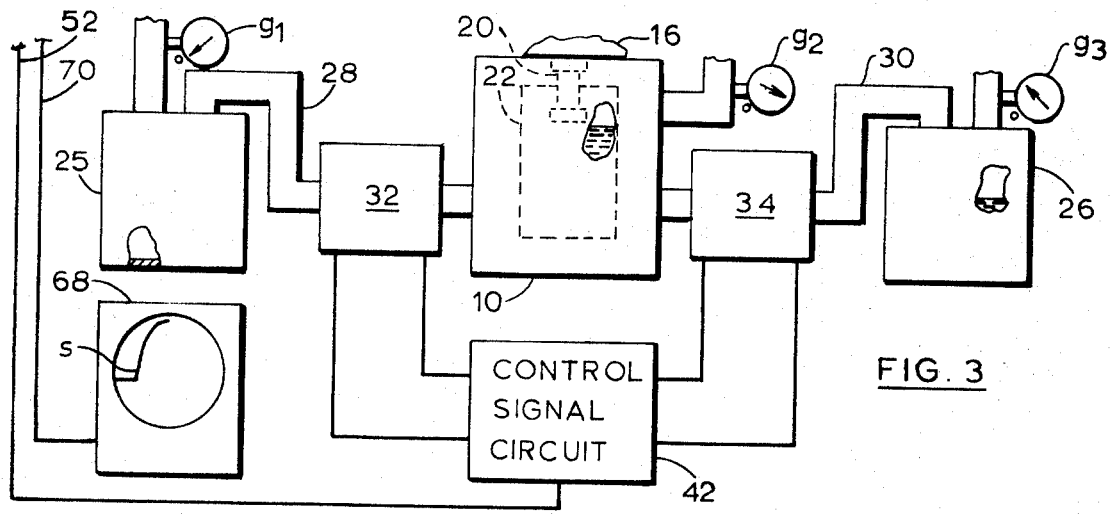

The next increment of the shock pulse programming is illustrated by FIG. 3 wherein it will be seen that the carriage 16 has reached the maximum extent of its downward movement. In this position the carriage 16 does not actually impact on the base 10, but is spaced slightly therefrom as increasing gas pressure force on the piston 20 arrests its downward movement. Increased gas pressure is provided by the control signal circuit (42) input to the electro-hydraulic valve 34. The pressure within the impact cylinder 22 increases to a maximum vlaue, as indicated by gauge $g_2$ and the pressure in tank 26 decreases to a minimum value, as indicated by gauge $g_3$. The relative changes of liquid level in the tank 26 and impact cylinder 22 can also be seen. Again the strength of the electrical field across the electro-hydraulic valve 32 is maintained at a maximum value so that there is no flow of liquid from the impact cylinder 22 into the tank 25. From the oscilloscope signal $s$ it will be seen that generation of the half sine wave shock pulse has reached its midpoint.

Figure 4:
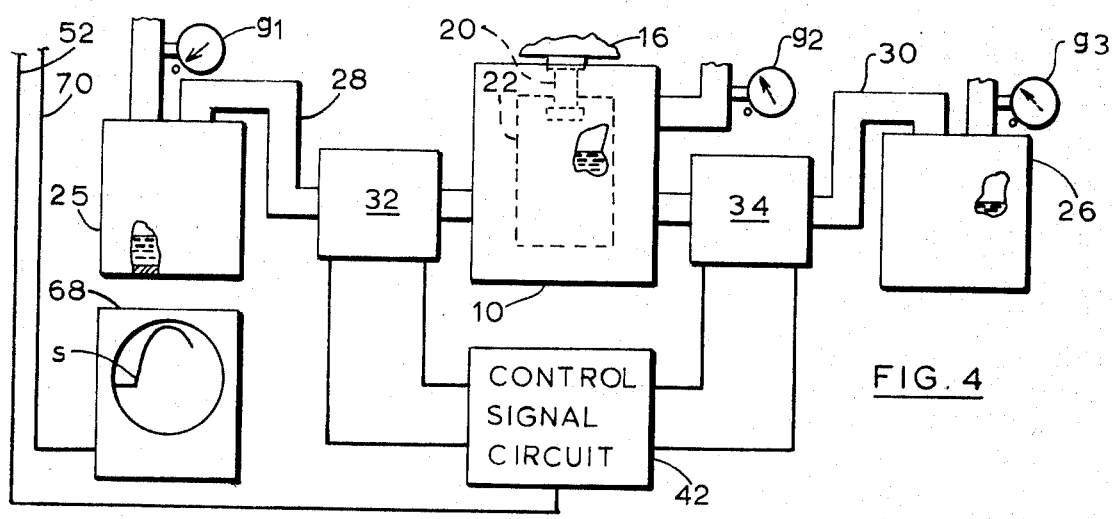

After reaching its lowest downward position, illustrated in FIG. 3, the resilient energy of the compressed gas displaces the piston 20 and carriage 16 upwardly as what may be considered a positive shock pulse continues to be induced into the test specimen $t$. This is illustrated in FIG. 4. The shock pulse form continues to be controlled by varying the gas pressure within the impact cylinder 22. At the point reached in FIG. 3, the electrical field strength across the electro-hydraulic valve 34 is increased to its maximum value so that there will be no further flow of electro-viscous liquid into the impact cylinder 22. Also at this point the electrical field strength is modulated across the electro-hydraulic valve 32 by the control signal circuit 42 (through the output lead 60 of the complex waveform synthesizer 58) to provide for controlled discharge of the electro-viscous liquid from the impact cylinder 22 into the receiver tank 25. As can be seen from gauge $g_2$ pressure within the cylinder and the liquid level therein decrease as the oscilloscope signal $s$ shows further development of the half sine wave shock pulse. It will also be seen that the electro-viscous liquid has entered the receiver tank 25.

Figure 5:
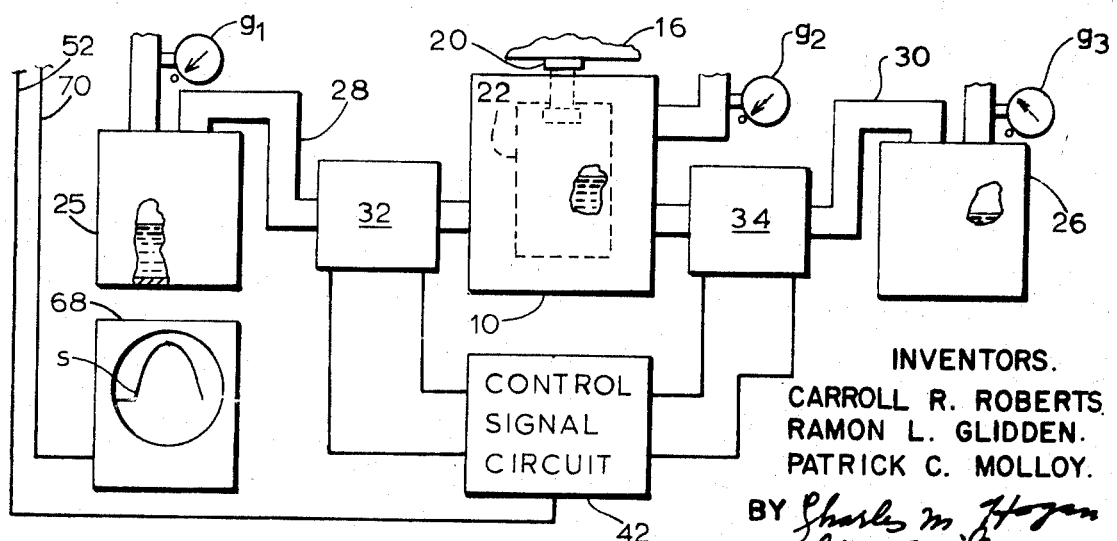

FIG. 5 illustrates completion of the half sine wave shock pulse as will be seen from the oscilloscope signal $s$ in that figure. From the point illustrated in FIG. 4, the electro-hydraulic valve 32, through the control signal from circuit 42, has provided for the scheduled discharged of the electro-viscous liquid from the impact cylinder 22 into the receiver tank 25 to the point where the pressure in the cylinder 22 has been reduced substantially to atmospheric pressure. At this point the carriage 16 can leave the piston 20 and may be "caught" by known means to complete the half sine wave shock pulse.

Manipulation of the three-way valves 36 and 38 and adjustment of the complex waveform synthesizer 58 enables the next shock testing cycle to be carried out with the tank 25 pressureized to serve as the electro-viscous liquid supply and the tank 26 vented to serve as the receiver for the electro-viscous liquid.

The described machine and programmer provide the capability of programming any desired shock pulse form as will be apparent to those skilled in the art, taking into account the physical and electrical characteristics of the components. Also it is possible to attain at least some of the described advantages through the use of a single tank which serves as both a supply source and receiver for the electro-viscous liquid. Additionally, within the broader aspects of the invention, it would be possible to employ other means for controlling, in predetermined fashion, the gas pressure within the impact cylinder 22 to program for a variety of shock pulse forms. It will also be apparent that the impact cylinder 22 could also be mounted on the carriage rather than on the reaction mass base 10 and further that the carriage does not necessarily have to travel in a vertical direction under the influence of gravity. The scope and spirit of the present inventive concepts are therefore to be derived solely from the following claims.

Having thus described the invention, what is claimed as novel and desired to be secured by Letters Patent of the United States is:

1. A shock testing machine comprising:
    a reaction mass base member,
    a carriage member, having a test specimen mounted thereon, movable toward said base member,
    an impact cylinder mounted on one of said members,
    a piston facing the other of said members and slidably mounted in the impact cylinder in the direction of carriage movement,
    means for sealing the impact cylinder, and
    means, effective upon impact of said carriage member on said piston, for scheduling gas pressure in said impact cylinder and providing a predetermined, variable force on said piston including means for controlling the flow of an incompressible liquid into and out of the impact cylinder to induce a desired shock pulse form in the test specimen on the carriage.

2. A shock testing machine as in claim 1 wherein means are provided for venting said impact cylinder to atmosphere and pessurizing it from a source of pressurized gas.

3. A shock testing machine as in claim 1 wherein said gas pressure scheduling means further includes adjustable synchronizing means for actuating the liquid flow control means in predetermined timed relationship to impact with said piston.

4. A shock testing machine as in claim 1 wherein
    the incompressible liquid is an electro-viscous liquid and
    the flow control means comprise electro-hydraulic valve means for providing a variable strength electrical field on the electro-viscous liquid.

5. A shock testing machine as in claim 4 wherein:
    the one member in which the impact member is mounted is the reaction mass base member,
    a pair of tanks are provided,
    conduits respectively connect said tanks with said impact cylinder, and
    the electro-hydraulic valve means include electro-hydraulic valves interposed in said conduits.

6. A shock testing machine as in claim 5 further including
    means for selectively sealing said tanks, venting them to atmosphere and pressurizing them with gas whereby the tanks may be alternately employed as a supply for and receiver of electro-viscous liquid flowing into and out of said impact cylinder.

7. A shock testing machine as in claim 6 wherein said gas pressure scheduling means further includes adjustable synchronizing means for actuating the liquid flow control means in predetermined timed relationship to impact of the carrige with said piston.

8. A shock testing machine as in claim 7 wherein the gas pressure scheduling means include complex waveform generator means actuated by said synchronizing means and varying the electrical field strength of the electro-hydraulic valves.

9. A shock testing machine as in claim 8 wherein means are provided for venting said impact cylinder to atmosphere and connecting it to a source of pressurized gas.

10. A shock pulse programmer for a shock testing machine comprisng a pair of members including a reaction mass base member and a test specimen bearing carriage member movable toward said base member, said programmer comprising:
    an impact cylinder adapted to be mounted on one of the testing machine members,
    a piston adapted to face and be impacted by the other testing machine member, said piston being sealingly and slidably mounted in the impact cylinder in the direction of carriage movement, and
    means, effective upon impact with said piston for scheduling gas pressure in said impact cylinder including means for controlling the flow of an incompressible liquid into and out of the impact cylinder to provide a predetermined, variable force on said piston thereby inducing a desired shock pulse form in the test specimen.

11. A shock pulse programmer as in claim 10 wherein said gas pressure scheduling means further includes adjustable synchronizing means for actuating the liquid flow control means in predetermined timed relationship to impact with said piston.

12. A shock pulse programmer as in claim 10 wherein
    the incompressible liquid is an electro-viscous liquid and
    the flow control means comprise electro-hydraulic valve means for providing a variable strength electrical field on the electro-viscous liquid.

13. A shock pulse programmer as in claim 12 wherein:
    the impact cylinder is adapted to be mounted on the reaction mass base member,
    a pair of tanks are provided,
    conduits respectively connect said tanks with said impact cylinder,
    the electro-hydraulic valve means include electro-hydraulic valves interposed in said conduits, and
    means are provided for selectively and respectively sealing said tanks and impact cylinder, venting them to atmosphere and connecting them with a source of pressurized gas.

* * * * *